United States Patent Office 3,165,657
Patented Jan. 12, 1965

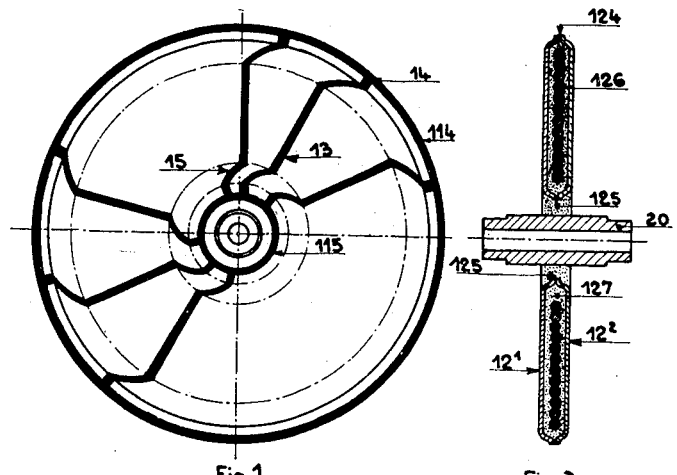
Fig 1
Fig 3
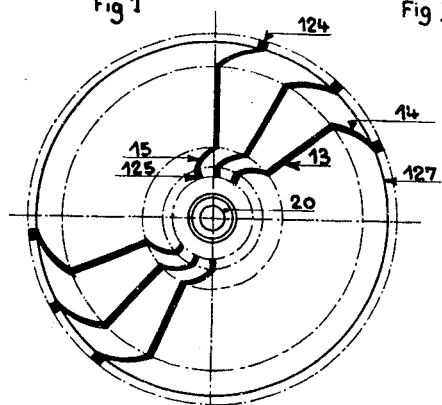
Fig 2
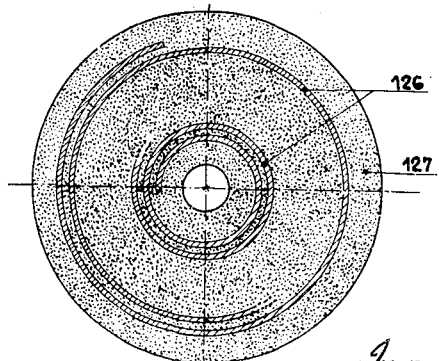
Fig 4

3,165,657
ELECTRICAL ROTATING MACHINES
Jacques Henry-Baudot, Antony, Seine, France, assignor, by mesne assignments, to Printed Motors, Inc., New York, N.Y.
Filed Sept. 15, 1958, Ser. No. 760,964
Claims priority, application France Mar. 28, 1958
8 Claims. (Cl. 310—268)

The present invention is a continuation in part of my co-pending application Serial No. 691,434, and concerns improvements in the arrangement of D.C. motors, A.C. generators and rotary converters including a stator member consisting of a plurality of magnetic pole pieces distributed around a substantially flat ring area and a flat rotor consisting of a winding spread out in the form of conductors printed on both sides of a thin dielectric or magnetic supporting disc.

While the above mentioned co-pending application is directed mainly to improving electrical rotating machines having a plurality of poles and efficiently operating even at relatively low speeds, I have also found such structures useful in machines of higher speeds up to one thousand r.p.m. and more where the rotor member is adapted to rotate in a magnetic field of relatively high intensity.

In this case, however, the rotor structure of the co-pending application was found to be no longer suitable because the conventional printing techniques delayed and complicated the manufacture of such rotors.

It is therefore an object of the present invention to provide an improved structure, and method of manufacture, for a wound rotor such as disclosed in the co-pending application but adapted to rotate at higher speed and to operate with higher magnetic flux values.

According to another object of the invention, the rotor winding is divided into two half-windings consisting of cut-out or pre-formed armature conductors which are moulded or embedded in over the opposite faces of a body of moulded thermosetting dielectric material. The interconnections between the armature conductors on the two faces of the winding may be made either before or after the moulding process, as desired by the manufacturer.

A further object of the invention is to incorporate in the moulded dielectric body a reenforcing member or core, preferably of magnetic material.

These and further objects of the invention will be more fully explained with reference to the accompanying drawings, wherein:

FIG. 1 shows a front view of an armature half winding after it has been cut from a metal sheet and before being subjected to a moulding operation;

FIG. 2 shows a front view of a half-winding unit such as shown in FIG. 1 after the inner and outer rings have been cut off;

FIG. 3 shows in cross section a view of a complete rotor according to the invention in a direction perpendicular to the rotor plane;

FIG. 4 shows in cross section a view along the center of the rotor of FIGURE 3 in direction parallel to its plane.

The half winding shown in FIG. 1 is referred to in FIG. 3 as $12^1$ which after application during assembly of the rotor is connected with a similar half winding $12^2$ on the opposite side of the rotor.

For simplicity's sake only, a small number of armature conductors 13 are shown in each half-winding.

The complete network of armature conductors 13 interconnected by inner and outer conductive rings 114 and 115 may be cut from a conductive metal sheet of suitable thickness of one or more millimeters.

The cutting operation may involve known methods such as stamping, electro-erosion or the like.

The substantially radial portions of conductors 13 are of a length substantially equal to the radial width of the annular airgap in the complete machine.

Outer and inner portions 14 and 15 of each conductor 13 are used to form the end-connections between conductors on opposite faces of the rotor to form an armature winding as explained in the co-pending application. Rings 114 and 115 of each half-winding unit serve to hold conductor portions 13, 14 and 15 in correctly spaced positions until the two units are assembled as explained below and are then cut-off and are not used in the final rotor structure.

As indicated in FIG. 3, conductor portions 14 and 15 on the two half-winding units are bent towards each and are connected together at their ends, thus connecting conductors on one face to conductors of the other face of the rotor. The connections may be made at the outer and inner peripheries 124 and 125 either by soldering or brazing.

To assemble a rotor, two half-winding units such as shown in FIG. 1, but with end portions 14 and 15 bent out of the plane of conductor portions 13 as described above, are mounted on a provisional or temporary support (not shown) with their curved conductive portions 14 and 15 pointing in opposite directions but with their axes in spatial alignment.

The end-connections between the two half-winding units are then made at the peripheries 124 and 125 and the inner ring 114 is cut away at this time. This forms the two half-winding units into a self-supporting cage structure.

As also stated above, the rotor is preferably reenforced by a core 126 inserted between the pre-formed half windings prior to connecting them together as just described.

Core 126 consists of magnetic material, preferably, of magnetic wire or ribbon wound into a flat spiral, the beginning and end portions of which are shown in FIG. 4.

The overall thickness of the completed rotor may be of the order of five times the thickness of the conductors of the winding.

Such a winding assembly is placed into a mould and the provisional support is removed. The conductors 13 of the two half-winding units are held in contact with opposite wall faces of the mold, and hub 20 may also be placed in the mold to be molded into proper position. The moulding operation is conventional and therefore, does not need to be specified. The moulding material is a dielectric of thermosetting and polymerisable resin type such as epoxyvinyl which when polymerized will resist the relatively high temperatures encountered in the operation of electrical rotors.

Alternatively, the half windings may be moulded into opposite faces of the rotor disc before the completion of the end connections and prior to removing inner and outer conductive rings 114 and 115, which may be easily removed at a later stage, for instance, cut off.

In the moulding or casting operation holes are formed in the dielectric material for completing the end-connections between conductors on the two faces after moulding is completed. These connections are made either by metallizing the holes and moulding pieces therethrough or by inserting pieces of wire which are brazed to the conductors.

It is of course possible to use conventional assembly and moulding procedures without departing from the spirit and scope of the invention.

From the foregoing it will be seen that the armature winding is first formed in the shape of a flat toroidal coil, the turns of which enclose a flat annular space. This winding coil differs from the ordinary toroidal coil in that the turns of the coil, instead of being formed in planes substantially parallel with the axis of the coil, are formed in planes which are substantially at right angles to the axis of the coil, that is, substantially parallel with the plane of the coil. The annular space within the coil and the space between turns of the coil are filled with a settable dielectric material which upon hardening forms a supporting core for the coil. Also, as indicated, the dielectric core may have an inner core of magnetic material embedded therein.

The subject-matter of certain claims being canceled from this application and concerned with a method of forming the disc-shaped rotor, is being claimed in applicant's copending application Serial No. 194,870 filed May 15, 1962.

I claim:

1. A disc-shaped rotor for an electric machine comprising a rigid disc-shaped body of dielectric material having an armature winding formed thereon, said winding comprising a first series of pre-formed half-turn conductors embedded in one face of said disc and being spaced apart throughout an annular area of said one face said annular area being concentric with the axis of said rotor, and a second series of pre-formed half-turn conductors embedded in the opposite face of said disc and being distributed throughout an annular area thereof corresponding in size and location with the said first mentioned annular area, each half-turn conductor in each set extending between the inner and outer boundaries of the annular supporting area for the set at substantially the same angle as the other conductors in the same set, the ends of the half-turn conductors on one face of said disc being connected by individual connections to the ends of the half-turn conductors on the opposite face of the disc to form an annular winding in which one-half of each turn of the winding is located on one face of said body and the other half-turn is located on the opposite face of said body.

2. A rotor according to claim 1 and including a reinforcing member embedded in said body within the turns of said winding.

3. A rotor according to claim 2 wherein said reinforcing member is formed of metal.

4. A rotor according to claim 2 wherein said reinforcing member is formed of magnetic metal.

5. A rotor according to claim 1 and including an annular core of magnetic material embedded in said body within the turns of said winding.

6. A rotor according to claim 5 wherein said core comprises a strip of magnetic material wound into a flat spiral.

7. A rotor for an electric machine comprising an electric winding having its turns formed as a toroidal coil to enclose at flat annular space, the turns of said coil being formed in planes substantially parallel with the plane of the coil, and a rigid annular core for said winding, said core comprising solid dielectric material formed in place within said annular space and within the space between the turns of said coil.

8. A rotor according to claim 7 and including an inner core of magnetic material embedded within said core of dielectric material.

References Cited in the file of this patent

UNITED STATES PATENTS

| | | |
|---|---|---|
| 295,534 | Frick | Mar. 25, 1884 |
| 2,441,960 | Eisler | May 25, 1948 |
| 2,483,024 | Roters | Sept. 27, 1949 |
| 2,758,231 | Welter | Aug. 7, 1956 |
| 2,763,916 | Korski | Sept. 25, 1956 |
| 2,773,239 | Parker | Dec. 4, 1956 |
| 2,847,589 | Haydon | Aug. 12, 1958 |
| 2,880,335 | Dexter | Mar. 31, 1959 |